(12) United States Patent
Leung et al.

(10) Patent No.: US 9,450,398 B2
(45) Date of Patent: Sep. 20, 2016

(54) PROTECTION CIRCUIT FOR ELECTRONIC SYSTEM

(71) Applicant: Diodes Incorporated, Plano, TX (US)

(72) Inventors: Frederick Leung, Cupertino, CA (US); Ang Yong, New Taipei (TW)

(73) Assignee: Diodes Incorporated, Plano, TX (US)

( * ) Notice: Subject to any disclaimer, the term of this patent is extended or adjusted under 35 U.S.C. 154(b) by 0 days.

(21) Appl. No.: 14/585,266

(22) Filed: Dec. 30, 2014

(65) Prior Publication Data

US 2016/0190795 A1 Jun. 30, 2016

(51) Int. Cl.
*H02H 3/28* (2006.01)

(52) U.S. Cl.
CPC ...................................... *H02H 3/28* (2013.01)

(58) Field of Classification Search
CPC .................................. H02H 3/28; H02H 3/16
See application file for complete search history.

(56) References Cited

U.S. PATENT DOCUMENTS

2012/0002800 A1* 1/2012 Lofthouse ............. H04M 1/738
379/412

\* cited by examiner

*Primary Examiner* — Kenneth B Wells

(57) ABSTRACT

Damages to the rectifying MOSFET in the secondary side of voltage converters are reduced or eliminated by inserting intermediary steps between detecting a dropping in the converter output voltage $V_{CC}$ and activating the under voltage lock out (UVLO) circuitry. During the intermediary steps, the timing for switching off the MOSFET is advanced to prevent the current flow in the MOSFET from reversing its direction.

5 Claims, 2 Drawing Sheets

PROTECTION CIRCUIT FOR ELECTRONIC SYSTEM

BACKGROUND

A galvanically isolated voltage converter is an electronic system that has a primary side and a secondary side coupled electrically by a transformer. The primary side of converters comprises a controller circuit and a switching power transistor and the output terminal of the power transistor is coupled to the primary winding of the transformer. The secondary side comprises a rectifying device coupled to an output capacitor and to the secondary winding of the transformer. During normal operation the capacitor maintains an output voltage near a specified value.

The rectifying device may be a p-n junction diode or a Schottky diode, which is an uni-directional device configured to conduct current during the periods when the switching transistor in the primary side is switched off and blocks current flow during the periods when the switching transistor in turned on. This type of rectification is referred to as non-synchronous rectification.

An alternative to a diode for rectification is a power MOSFET, which is a bi-directional device and is configured to turn on to conduct current and to turn off to block current flow following a command signal from a controller circuit. The controller on the secondary side of the converter may be a single integrated circuit chip, which may or may not encompass the MOSFET. A well-arranged combination of a secondary side controller and a MOSFET dissipates less power than the rectifying diode it replaces. This type of rectification is referred to as synchronous rectification.

At the occurrence of abnormal output voltage drop, the converter shuts down to protect the system from damage by activating under voltage lock out (UVLO) circuitry on both sides of the converter. That is, the primary side stops pumping energy into the secondary side and the secondary side stops charging the output capacitor.

SUMMARY

The Inventors observed that even with UVLO protection, many converters suffer from overheating at the occurrence of this abnormality.

The Inventors recognized that the principal reason for the overheating is that the two sides of the converter do not react to the occurrence of the abnormality in correct sequence. In most voltage converters, the secondary side is connected to the output terminal and receives the output voltage drop directly but the primary side has to detect such event by way of the transformer and this information may reach the primary side with a slight time delay. If the lock-out action in primary side is completed before the secondary side, power ceases to be pumped into the secondary side even while the MOSFET in the secondary side is still switching and the converter will survive the voltage drop and can resume its normal operation after the cause of the unexpected output voltage drop is removed.

However, if the UVLO circuit on the secondary side is triggered and shuts off the MOSFET before the primary side ceases pumping energy onto the secondary, the energy delivered from the primary side in term of electrical current can no longer flow in the low resistive channel of the MOSFET and must flow through its body diode. Since the ohmic loss is higher when current flows through the body diode than when the same current flows through the MOSFET channel, extra heat is generated in the MOSFET.

In voltage converters that embody the invention, this problem is eliminated or greatly reduced by having a buffer period inserted into the secondary side lock out sequence so that the converter shuts down more orderly when experiencing an output voltage drop unexpectedly. During this period, the MOSFET continues switching but with a modified timing.

In one implementation, the secondary side controller is configured to turn on the MOSFET when its drain voltage $V_D$ reaches a preset threshold $V_{THON}$ with respect to its source voltage $V_S$. In one example, $V_{THON}$ is set at $-150$ mV. During the turned on period, electrical current flows through the channel to charge the output capacitor to maintain it at 5 V with respect to $V_S$. When the current in the MOSFET drops from the peak value $I_{PEAK}$ towards zero the drain voltage $V_D$ also drops with respect to $V_S$. When $V_D$ drops to a second preset threshold $V_{THOFF}$ of about $-5$ mV the controller turns the MOSFET off.

When output voltage unexpectedly drops from 5 V to below a preset voltage such as the preset UVLO threshold in the primary side of the controller, the secondary controller activates the first step of MOSFET shutting down sequence. In this example, the preset voltage is 4.2 V, which is about 16% below the specified $V_{OUT}$ of 5 V. At this stage, the MOSFET continues to switch on at $V_{THON}$. The switching-off threshold of the MOSFET $V_{THOFF}$, however, is advanced in order to turn off the MOSFET earlier to prevent the current in the MOSFET from reversing its direction as the $V_{DS}$ changes polarities. In this example, the advanced $V_{THOFF}$ is set at $-20$ mV.

If the output voltage recovers during this stage and rises above 4.2 V for this example, the $V_{THOFF}$ reverts back to $-5$ mV and the system reverts back to normal operation. If the output voltage drop persists to a second threshold value, in this example, 3 V, under-voltage-lock-out procedure is activated and the secondary side controller and the MOSFET are shut down.

The values mentioned in this example are for reference only. Depending on different designed output voltages, these values will change accordingly. Even in 5 V designs, other values may be substituted when appropriate.

BRIEF DESCRIPTION OF THE DRAWING FIGURES

DETAILED DESCRIPTION

Figure 1:
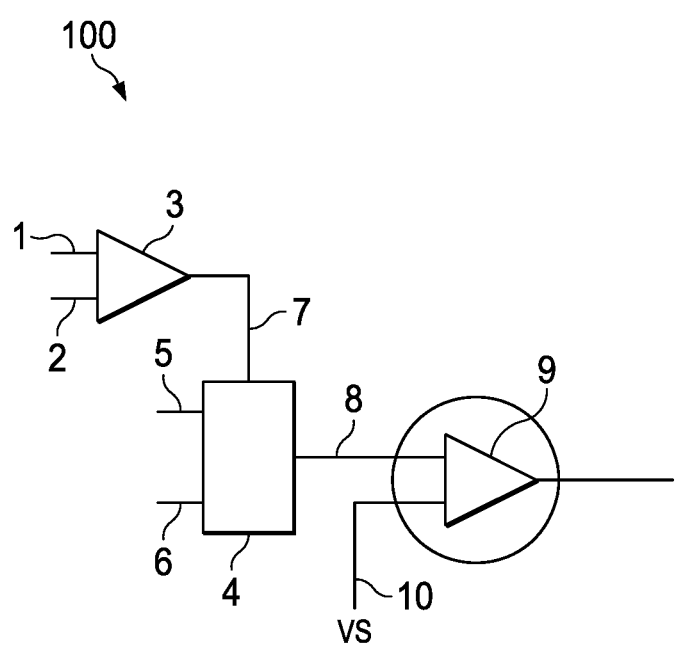
FIG. 1 depicts a block diagram of a partial circuit of a voltage converter according to the invention.

FIG. 1 depicts a portion of a voltage converter, specifically a sub-circuit 100 in the secondary side of a voltage converter. The function of the sub-circuit 100 is to interrogate the $V_{CC}$ voltage and to determine its relative value with respect to it to a reference voltage that is set at preset amount below the expected normal $V_{CC}$. When $V_{CC}$ drops from its expected normal value by a preset amount, the sub-circuit triggers to change the turn-off voltage threshold of the MOSFET.

The sub-circuit 100 comprises a comparator 3 with two input terminals 1, and 2. Terminal 1 is configured to receive $V_{CC}$ and terminal 2 is configured to receive a reference voltage. In this example, the reference voltage is set at 4.2 V, which is about 16% lower than the normal $V_{CC}$ of 5V. Other value for the reference voltage may be appropriate and may be used. When $V_{CC}$ is above 4.2 V, the system is deemed to be operating normally and the comparator outputs a 1 at its output terminal. When $V_{CC}$ drops below 4.2 V, the output of the comparator switches from a 1 to a 0.

The output of the comparator is coupled to a multiplexor 4. Two input terminals 6 and 6 of the multiplexor 4 are configured to receive two turn-off threshold voltages $V_{THOFF1}$ and $V_{THOFF2}$. In this example, $V_{THOFF1}$ is set at −5 mV and $V_{THOFF2}$ is set at −20 mV. Other values for the turn-off threshold may be appropriate and may be used. When the terminal 7 of the multiplexor 4 receives a 1 signal, indicating a normal functioning condition, it selects $V_{THOFF1}$ (−5 mV) at terminal 6 and passes it to the output terminal 8. When the multiplexor 4 receives a 0 signal from the comparator 3, indicating $V_{CC}$ as below the threshold of 4.2 V, the multiplexor 4 selects $V_{THOFF2}$ (−20 mV) at terminal 5 and passes it to the output terminal 8.

The output of the multiplexor 4 is added as a bias voltage to a second comparator 9. The comparator 9 compares the voltage $V_S$ at one terminal 10 to $V_D$ in conjunction with the bias voltage $V_{THOFF1}$ or $V_{THOFF2}$ at the other input terminal 8. When the biased $V_D$ is less than $V_S$, the comparator 9 switches and sends a signal to turn off the MOSFET.

With this sub-circuit as an example, the two turn-off threshold voltages can be successfully incorporated in the converter so the MOSFET can be switched off under different timing schemes depending on whether the converter $V_{CC}$ is above or below the preset threshold.

Figure 2:
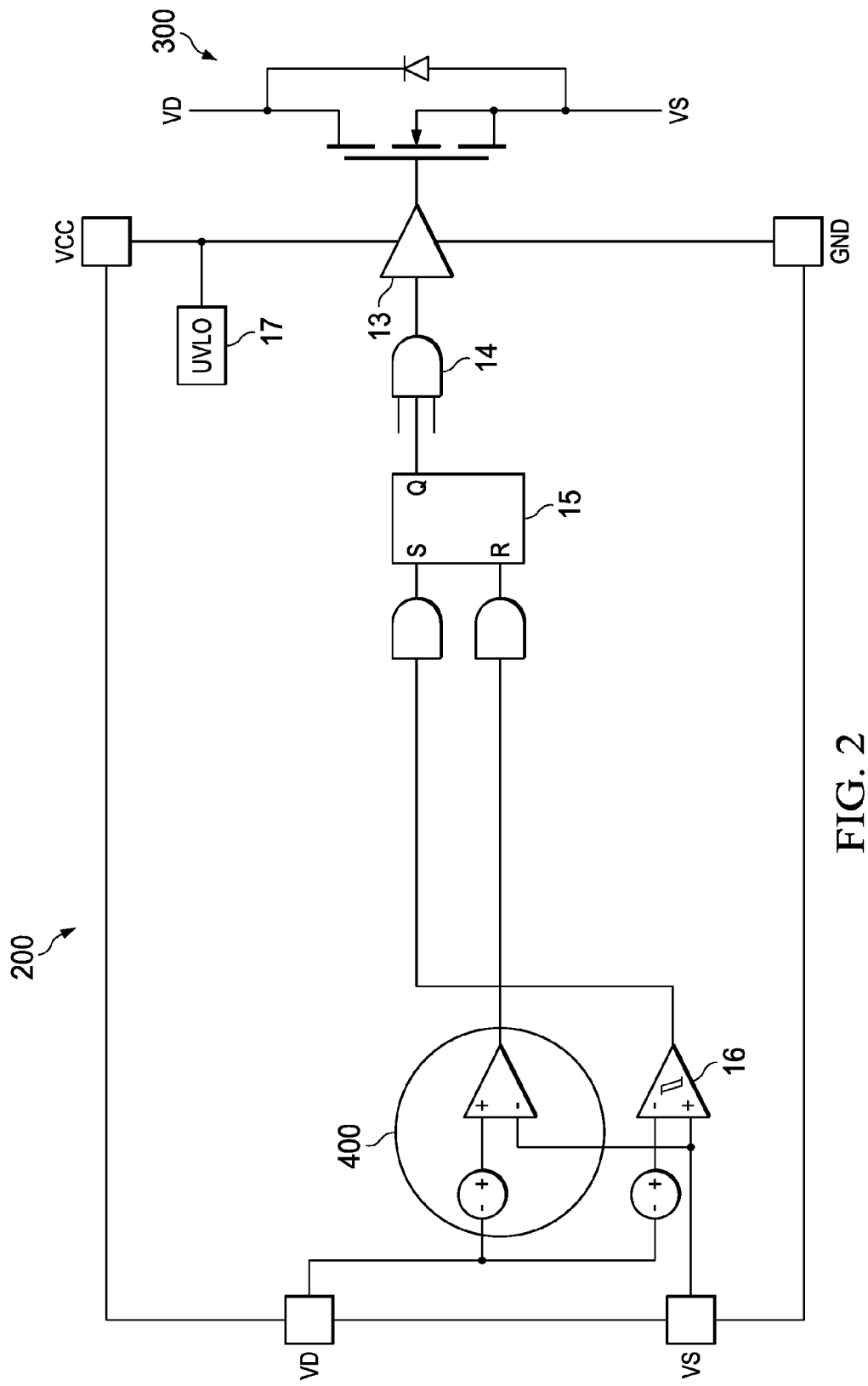
FIG. 2 depicts a block diagram of another partial circuit of a voltage converter according to the invention.

FIG. 2 depicts the schematic diagram of a circuit 200, which is a portion of a voltage converter, and a MOSFET 300 that is driven by the circuit 200. The circuit 200 comprises a sub-circuit 400, which is similar to the sub-circuit 100 in drawing FIG. 1.

The MOSFET 300 in this example is external to the circuit 200, which is built in one integrated circuit chip. In other examples, the MOSFET may be a portion of the same integrated circuit chip.

The MOSFET is driven by a driver element 13, which in turn is driven by a AND gate 14. When the output of the AND gate 14 is in a high state, the driver element 13 applies a voltage near $V_{CC}$ on the gate terminal of the MOSFET and turn it on. When the output of the AND gate 14 is in a low state, the driver element 13 applies a voltage near GND on the gate terminal of the MOSFET and turns it off.

The sub-circuit 400 is coupled to a SR flip-flop 15 at its RESET terminal. The output Q of the flip-flop 15 is coupled to the AND gate 14. As illustrated in FIG. 1, when $V_{CC}$ drops below a threshold voltage, the sub-circuit 400 switches from a first threshold voltage $V_{THOFF1}$ to a second threshold voltage $V_{THOFF2}$. This changes the timing of switching-off of the MOSFET so it goes off when $V_D$ is further away from the $V_S$. In this example, the RESET of the RS flip-flop 15 is triggered when $V_D$ is within −20 mV of $V_S$. At this point, the MOSFET will have about 100 nano-seconds to complete turning off before $V_D$ becomes positive, which is to be avoid.

The circuit 200 also comprises a comparator 16 to interrogate the $V_D$ in order to determine the timing of turning on the MOSFET. The comparator 16 is biased by $V_{THON}$, which in this example is set at −150 mV. Comparator 16 compared to $V_D$ to $V_S$ and when $V_D$ is within $V_{THON}$ with respect to $V_S$, the comparator 16 switches and triggers the SR flip-flop 15 and, through the AND gate 14 and the driver element 13, applies a voltage near $V_{CC}$ to the gate terminal of the MOSFET 300 to turn it on.

The circuit 400 also comprises a UVLO circuit 17 coupled to VCC. When VCC drops below a second threshold, which in this example, is set at 3V—about 40% from the normal 5 V, the UVLO circuit 17 shuts down the controller circuit 200.

The invention claimed is:
1. A system, comprising:
 a multiplexor configured to select and pass to a output terminal a first turn-off threshold voltage or a second turn-off threshold voltage; and
 a MOSFET having a source voltage and a drain voltage;
 a comparator configured to output a signal for turning off the MOSFET upon detecting the difference between the source voltage and the drain voltage as being within the selected first turn-off threshold voltage or the selected second turn-off threshold voltage.
2. The system of claim 1, in which the multiplexor and the comparator are in one integrated circuit chip.
3. The system of claim 2, in which the MOSFET is not a portion of the integrated circuit chip.
4. The system of claim 1, further comprising a second comparator configured to compare a voltage signal to a reference voltage and deliver the result of the comparison in binary form to the multiplexor.
5. The system of claim 4, in which the selection of the threshold voltages depends on the status of the binary result.

* * * * *